(12) United States Patent
Morse et al.

(10) Patent No.: US 8,345,559 B2
(45) Date of Patent: Jan. 1, 2013

(54) MPLS DIAGNOSTICS TOOL

(75) Inventors: Steve Richard Morse, Nepean (CA);
Attaullah Zabihi, Kanata (CA);
Chuong Ngoc Ngo, Ottawa (CA);
Christopher Warren Murray, Ottawa (CA)

(73) Assignee: Alcatel Lucent, Paris (FR)

( * ) Notice: Subject to any disclaimer, the term of this patent is extended or adjusted under 35 U.S.C. 154(b) by 765 days.

(21) Appl. No.: 11/878,982

(22) Filed: Jul. 30, 2007

(65) Prior Publication Data
US 2009/0037771 A1    Feb. 5, 2009

(51) Int. Cl.
*H04J 3/14* (2006.01)
(52) U.S. Cl. .......................................... 370/244; 702/25
(58) Field of Classification Search .................. 370/217, 370/218, 221, 225, 228, 244, 351, 352, 353, 370/395.41, 395.5, 400, 401, 468, 469, 477, 370/903, 254; 714/25
See application file for complete search history.

(56) References Cited

U.S. PATENT DOCUMENTS

| 7,539,131 | B2 * | 5/2009 | Shen | 370/217 |
| 2004/0004955 | A1 * | 1/2004 | Lewis | 370/351 |
| 2005/0226167 | A1 * | 10/2005 | Braun et al. | 370/254 |
| 2008/0084890 | A1 * | 4/2008 | Kompella | 370/400 |
| 2008/0255781 | A1 * | 10/2008 | Beard et al. | 702/59 |

* cited by examiner

*Primary Examiner* — Kevin C Harper
*Assistant Examiner* — Leon Andrews
(74) *Attorney, Agent, or Firm* — Kramer & Amado, P.C.

(57) ABSTRACT

A method, system and diagnostic tool for diagnosing a problem in CSPF and non-CSPF MPLS networks, including problems with LDP tunnels. This includes one or more of the following: hopping from network element to network element; determining whether an LSP between elements is operational; determining whether the hop was strict or loose; evaluating whether there is an existing path between the elements; finding and remembering an IGP link between the elements; recognizing whether the LSP is an FRR LSP; diagnosing a cause of the LSP between the elements being down; and altering a display of a topology map of the network to indicate the cause of the problem.

21 Claims, 12 Drawing Sheets

MPLS DIAGNOSTICS TOOL

BACKGROUND OF THE INVENTION

1. Field of the Invention

This invention relates generally to multi-protocol label switching (MPLS) networks.

2. Description of Related Art

In computer networking and telecommunications, MPLS networks are a data-carrying mechanism which emulates some properties of a circuit-switched network over a packet-switched network. MPLS operates at an OSI Model layer that is generally considered to lie between traditional definitions of Layer 2 (data link layer) and Layer 3 (network layer), and thus is often referred to as a "Layer 2.5" protocol. MPLS was designed to provide a unified data-carrying service for both circuit-based clients and packet-switching clients which provide a datagram service model. MPLS can be used to carry many different kinds of traffic, including IP packets, as well as native ATM, SONET, and Ethernet frames.

Unfortunately, errors sometimes occur in MPLS networks. Thus, there is a need for tools to diagnose problems in MPLS networks The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation which may be apparent to those skilled in the art. Accordingly, the present invention resides in the novel methods, arrangements, combinations and improvements herein shown and described in various exemplary embodiments.

SUMMARY OF THE INVENTION

In light of the present need for tools to diagnose problems in MPLS networks, a brief summary of various exemplary embodiments is presented. Some simplifications and omission may be made in the following summary, which is intended to highlight and introduce some aspects of the various exemplary embodiments, but not to limit its scope. Detailed descriptions of a preferred exemplary embodiment adequate to allow those of ordinary skill in the art to make and use the invention concepts will follow in later sections.

Various exemplary embodiments include a method, system or diagnostic tool for diagnosing a problem in a multi-protocol label switching network, including one or more of the following: hopping from a first network element to a second network element; determining that a label switched path between the first network element and the second network element is not operational; identifying that the hopping from the first network element to the second network element was strict; finding an interior gateway protocol link between the first network element and the second network element; remembering the interior gateway protocol link between the first network element and the second network element; diagnosing a cause of the label switched path between the first network element and the second network element not being operational; and altering a display of a topology map of the multi-protocol label switching network to indicate the cause of the label switched path between the first network element and the second network element not being operational.

Likewise, various exemplary embodiments include a method, system or diagnostic tool for diagnosing a problem in a non-constrained shortest path first multi-protocol label switching network, including one or more of the following: hopping from a first network element to a second network element; determining that a label switched path between the first network element and the second network element is not operational; identifying that the hopping from the first network element to the second network element was loose; recognizing that the label switched path is a fast reroute label switched path; and diagnosing a cause of the label switched path between the first network element and the second network element not being operational.

Similarly, various exemplary embodiments include a method, system or diagnostic tool for diagnosing a problem in a multi-protocol label switching network, including one or more of the following: hopping from a first network element to a second network element; determining that a label switched path between the first network element and the second network element is not operational; evaluating whether there is an existing path between the first network element and the second network element; diagnosing a cause of the label switched path between the first network element and the second network element not being operational; altering a display of a topology map of the multi-protocol label switching network to indicate the cause of the label switched path between the first network element and the second network element not being operational; remembering an interior gateway protocol link between the first network element and the second network element; determining whether the interior gateway protocol link between the first network element and the second network element is operational; evaluating whether a reservation protocol interface is configured in both directions between the first network element and the second network element; evaluating whether an existing interior gateway protocol link between the first network element and the second network element is down; evaluating whether an interior gateway protocol link exists between the first network element and the second network element; and verifying that sufficient bandwidth exists on the interior gateway protocol link to satisfy bandwidth requirements of the label switched path.

Various exemplary embodiments of the diagnostic tool include a reservation protocol label switched path manager that receives information regarding path changes between a plurality of elements in the multi-protocol label switching network, a path monitor that monitors and evaluates the information regarding path changes between the plurality of elements in the multi-protocol label switching network, including diagnosing causes of label switched paths between the plurality of elements in the multi-protocol label switching network not being operational, and a database that archives time-stamped historical information regarding path changes between the plurality of elements in the multi-protocol label switching network and causes of label switched paths between the plurality of elements in the multi-protocol label switching network not being operational.

Various exemplary embodiments also include a method of diagnosing a problem with a label distribution protocol tunnel, including one or more of the following: performing an interior gateway protocol shortest path; identifying a link in the interior gateway protocol shortest path; evaluating whether an interface in the label distribution protocol is configured in both directions; retrieving label distribution protocol bindings at a first end point and at a second end point of the label distribution protocol tunnel; altering a display of a topology map that includes the label distribution protocol tunnel; and performing a label distribution protocol ping to evaluate whether a label distribution protocol tunnel exists. In some embodiments, retrieving label distribution protocol bindings at a first end point and at a second end point of the label distribution protocol tunnel includes retrieving a label of the first end point and retrieving a label of the second end point.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
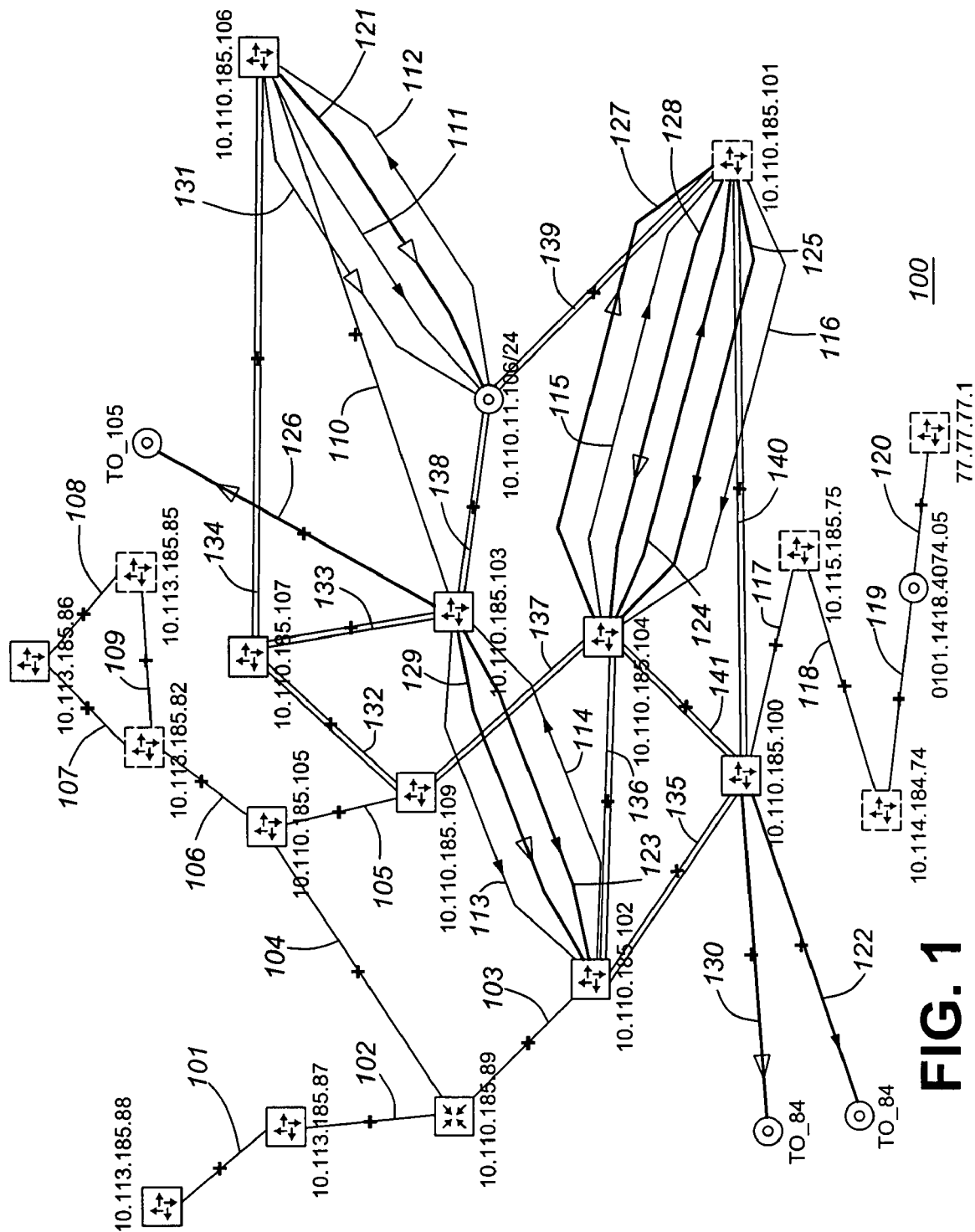
FIG. 1 is a schematic diagram of a first embodiment of an exemplary MPLS topology map.

Referring now to the drawings, in which like numerals refer to like components or steps, there are disclosed broad aspects of various exemplary embodiments.

FIG. 1 is a schematic diagram of a first embodiment of an exemplary MPLS topology map 100. An MPLS view such as the exemplary view shown in MPLS topology map 100 is used to display the configured MPLS/RSVP and LDP links in a network on the same map to provide a complete view of the MPLS network.

Thus, a map such as exemplary map 100 provides quick and simple ways to determine the health of the MPLS network by visually determining where missing configurations exist or with various diagnostic tools. This will be described in greater detail below.

The MPLS/RSVP and LDP links for exemplary map 100 are built by examining the underlying interior gateway protocol (IGP) link that is associated to it to determine the far end point. An IGP link is open shortest path first (OSPF) or intermediate system to intermediate system (ISIS). Thus, if a link exists in both OSPF and ISIS, then in various exemplary embodiments, four links are shown on the map, two in each direction for each protocol.

Figure 2:
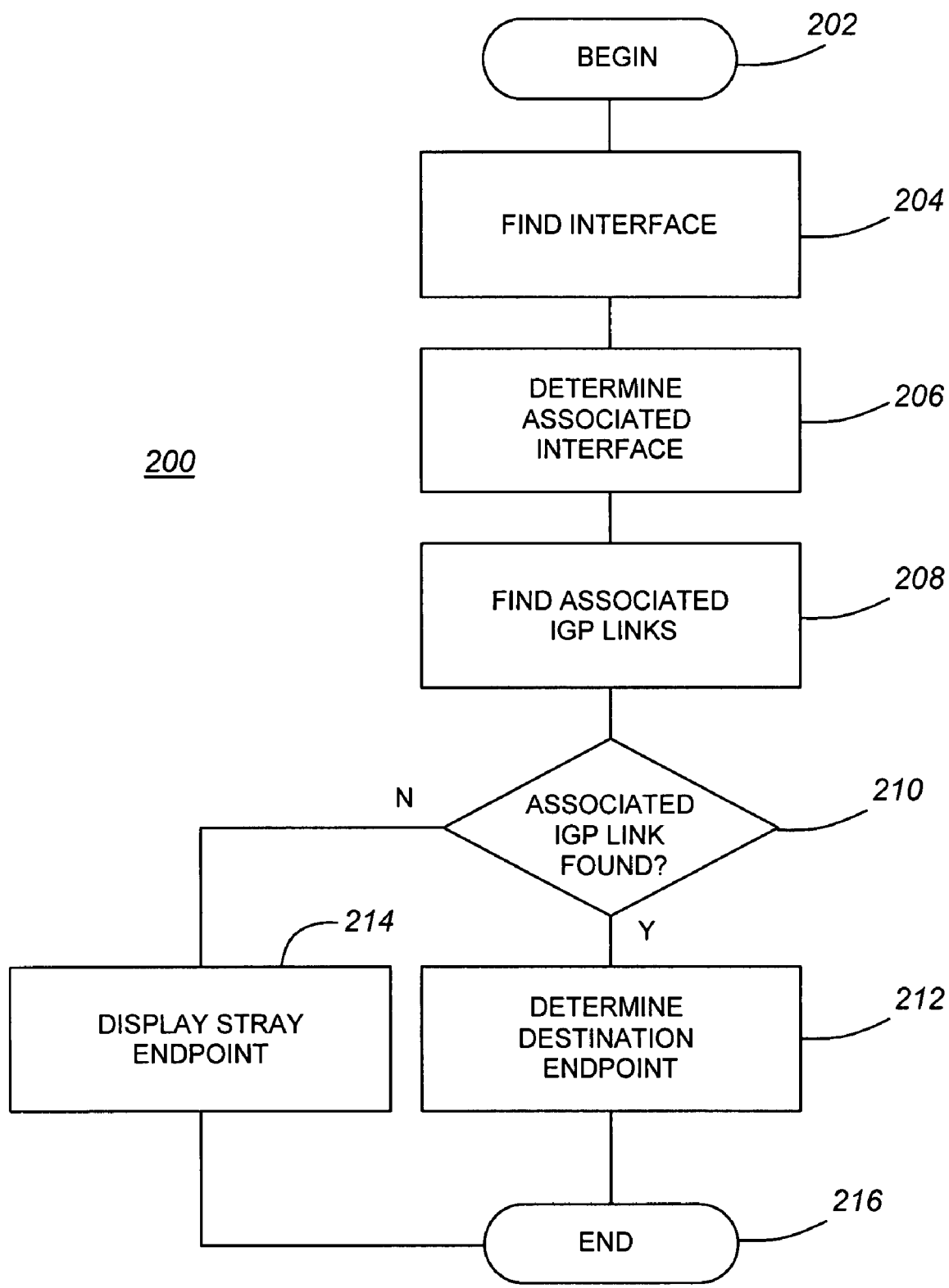
FIG. 2 is a flowchart of an exemplary embodiment of a method of determining the source and destination of each link in an MPLS topology.

FIG. 2 is a flowchart of an exemplary embodiment of a method of determining the source and destination of each link in an MPLS topology.

The method begins in step 202. The method then proceeds to step 204 where an MPLS/RSVP or LDP interface is found. This object, when found, contains source information for the link. The method then proceeds to step 206.

In step 206, a determination is made which network interface the object of step 204 is associated with. The method then proceeds to step 208 where the network interface information obtained in step 206 is used to find which IGP links are configured using that network interface.

Following step 208, the method proceeds to step 210 where a determination is made whether an associated IGP link is found. If an associated IGP link is found, the method proceeds to step 212 where a destination end point is determined.

It should be noted that it is possible to have more than one IGP link associated with the network interface determined in step 206. Thus, certain criteria ought to be used to determine the destination end point from among the plurality of IGP links associated with the network interface in such instances. For example, one or more of the following approaches may be used to determine the destination end point when more than one IGP link is associated with the network interface.

First, any point-to-point link may be used to determine the destination end point. Second, an IGP link whose end point is an OSPF subnet may be used to determine the destination end point. Third, an IGP link whose end point is an ISIS level one pseudonode may be used to determine the destination end point. Fourth, an IGP link whose end point is an ISIS level two pseudonode may be used to determine the destination end point.

If an associated IGP link is not found, the method proceeds to step 214 where the MPLS/RSVP or LDP link is displayed to a "stray" end point with the interface's name as the label of the end point.

Once the destination end point is determined in step 212, the method proceeds to step 216 where it ends. Likewise, once the stray end point is displayed in step 214, the method proceeds to step 216 where the method ends.

The exemplary method shown in FIG. 2 uses information from various different objects (network interface, MPLS interface, etc). Thus, in many embodiments of the method of FIG. 2, the router is managed by a corresponding equipment management system (EMS).

Referring again to FIG. 1, a strong association exists between MPLS/RSVP and LDP links and IGP links. Thus, it is preferred that IGP links are displayed on the MPLS map, such as exemplary map 100, for informational purposes.

The operational statuses of all the various links on the MPLS map 100 are differentiated using different appearances. In one embodiment, different operational statuses of different links are shown in an MPLS map using different colors.

The following links represent IGP links that are operationally up: 101, 102, 103, 104, 105, 106, 107, 108, 109, 110, 111, 112, 113, 114, 115, 116, 117, 118, 119 and 120. The following links represent MPLS/RSVP links that are operationally up: 122, 123, 124 and 125. Link 121 represents an MPLS/RSVP link that is operationally down.

The following links are LDP links that are operationally up: 126, 127, 128, 129 and 130. Link 131 represents an LDP link that is operationally down. As depicted in map 100, links 122, 126 and 130 are stray links.

Some links between network elements fall into more than one of the foregoing categories. Examples of such links in map 100 include the following: 132, 133, 134, 135, 136, 137, 138, 139, 140 and 141. None of the links shown in map 100 represent IGP links that are operationally down. However, in various exemplary embodiments, when an IGP link is down, that link is represented on the topology map in a manner that differentiates it from all other types of links described above, and trumps all other ways of depicting a link. For example, in one exemplary embodiment all links on a topology map between network elements with an IGP link that is down are depicted in red.

The MPLS view, such as exemplary map 100, provides many tools to identify possible problems in an MPLS network. These tools can be run individually or together to quickly determine the root cause of a problem so that a particular problem can be resolved quickly. Several exemplary tools will now be described. In one embodiment, each tool can be selected to run by right-clicking on the MPLS map, such as map 100, to view a list of the available tools or utilities.

In a large network it might be hard to determine between which routers LDP or RSVP are configured. This will allow the user to highlight which pairs of routers do not have either LDP or RSVP configured on the IGP links between them. Only IGP links that match these criteria will be highlighted for easy detection.

Figure 3:
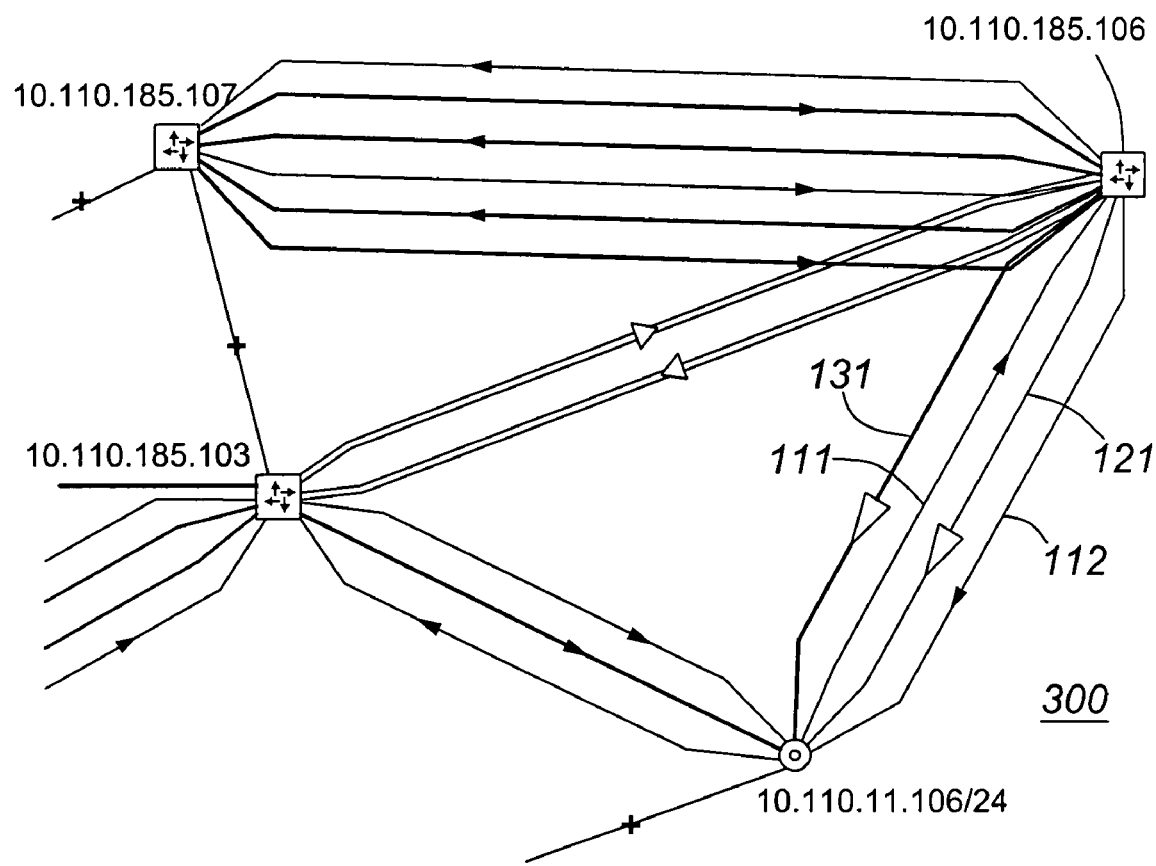
FIG. 3 is a schematic diagram of a fragmented portion of the exemplary MPLS topology map of FIG. 1 highlighting a missing MPLS and/or reservation protocol (RSVP) link.

FIG. 3 is a schematic diagram 300 of a fragmented portion of the exemplary MPLS topology map of FIG. 1 highlighting a missing MPLS/RSVP link. The missing MPLS/RSVP link in diagram 300 is the link between node 10.110.185.106 and node 10.110.185.103.

Figure 4:
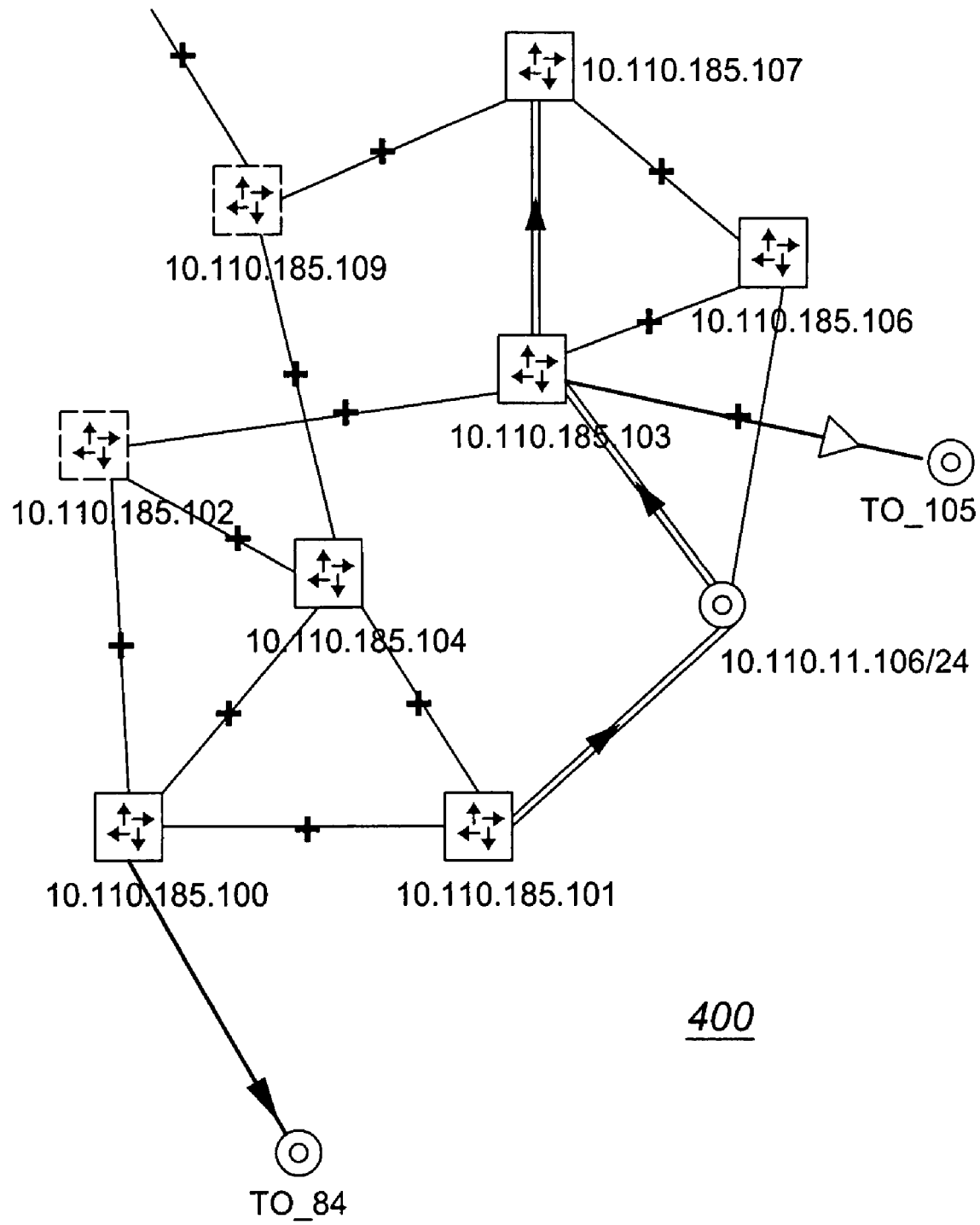
FIG. 4 is a schematic diagram of a fragmented portion of the exemplary MPLS topology map of FIG. 1 depicting a highlighted label switched path (LSP)

FIG. 4 is a schematic diagram 400 of a fragmented portion of the exemplary MPLS topology map of FIG. 1 depicting a highlighted LSP. In various exemplary embodiments, one or more of the following are highlighted on an MPLS map.

The active LSP path is highlighted in some embodiments. The active LSP path is the path that traffic is currently riding over. The provisioned path of the active LSP path is highlighted in some embodiments. The provisioned path of the active LSP could be the provisioned path of the primary path. This could different from the actual path due to FRR. The provisioned path of any LSP path is highlighted in some embodiments. This includes primary, standby, and secondary LSP paths. Lastly, LDP tunnels are highlighted in some embodiments.

Highlighting LSP paths is useful in determining which way actual LSPs are traversing the network. Missing LDP tunnels and the associated information can be used with other MPLS tools when troubleshooting problems in the network.

Figure 5:
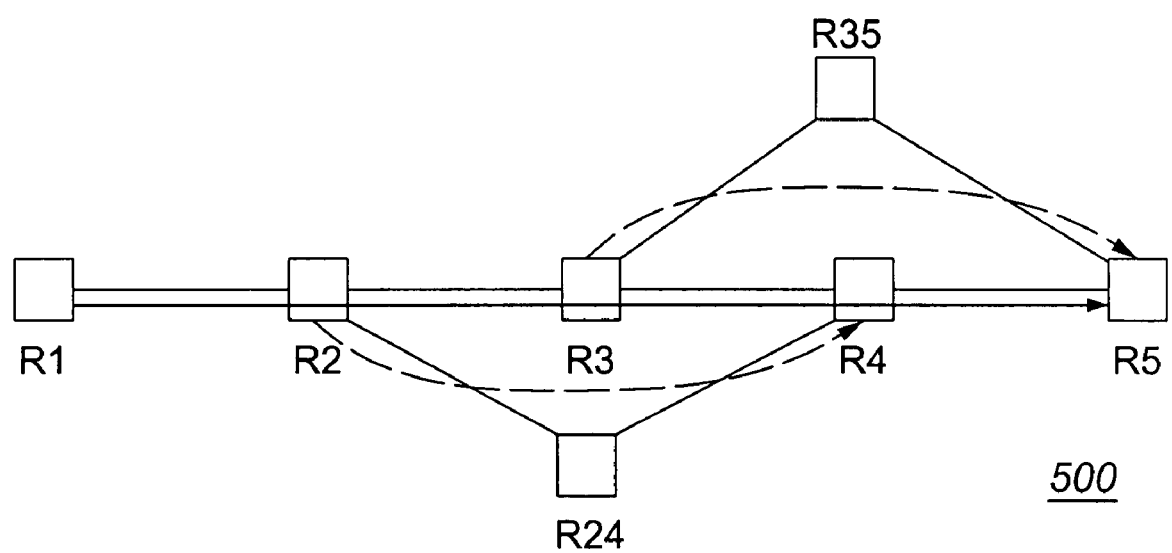
FIG. 5 is a schematic diagram illustrating the concept of bypassed tunnels in a fast reroute (FRR) LSP.

FIG. 5 is a schematic diagram 500 illustrating the concept of bypassed tunnels in an FRR LSP. This illustrates how an MPLS diagnostics tool can help the visualization of a FRR RSVP LSP actual path.

When an FRR LSP is provisioned, bypass tunnels could be created along the path so that the path can be rerouted as fast as possible. When the FRR LSP from R1 (router 1) to R5 is set up, the actual path proceeds from R1 to R2 to R3 to R4 to R5. R2 also creates a bypass tunnel via R24 to get around R3 if the R2-R3 link fails. Similarly, R3 creates a bypass tunnel via R35 to get around R4. Only the source router R1 knows the entire path of the LSP.

When link R2-R3 is down for example, the actual path of the R1 to R5 LSP becomes R1 to R2 to R24 to R4 to R5. The source router R1 knows that a reroute has happened, but the source router R1 does not know which of the bypass tunnels has or have been used. Furthermore, the source router R1 does not know the exact path that the bypass tunnels take.

In various exemplary embodiments, the diagnostics tool informs an operator which bypass tunnels are available for a given LSP along the route. When a reroute has happened, the diagnostics tool can identify the actual data path after the rerouting.

Also, in some embodiments the new real path of the LSP is recorded, hop by hop. Typically, this would occur where the LSP is monitored.

An MPLS map, such as map 100, provides the ability to highlight IGP Links based on certain criteria. In various exemplary embodiments that include the capability to highlight IGP links, when selecting this option the user is presented with the ability to construct a filter based on IGP related properties. For example, a filter may be constructed to require a bandwidth greater than 5 and Admin Group number 6. In embodiments that include filter criteria, only the IGP links that satisfy the criteria are highlighted.

Expanding on the foregoing example, a user might be troubleshooting an issue in which an LSP highlighted on an MPLS map is not traversing the desired path. Using a feature to highlight the IGP link it may be determined that the intended path does not have the proper admin group and/or the necessary bandwidth provisioned.

Figure 6:
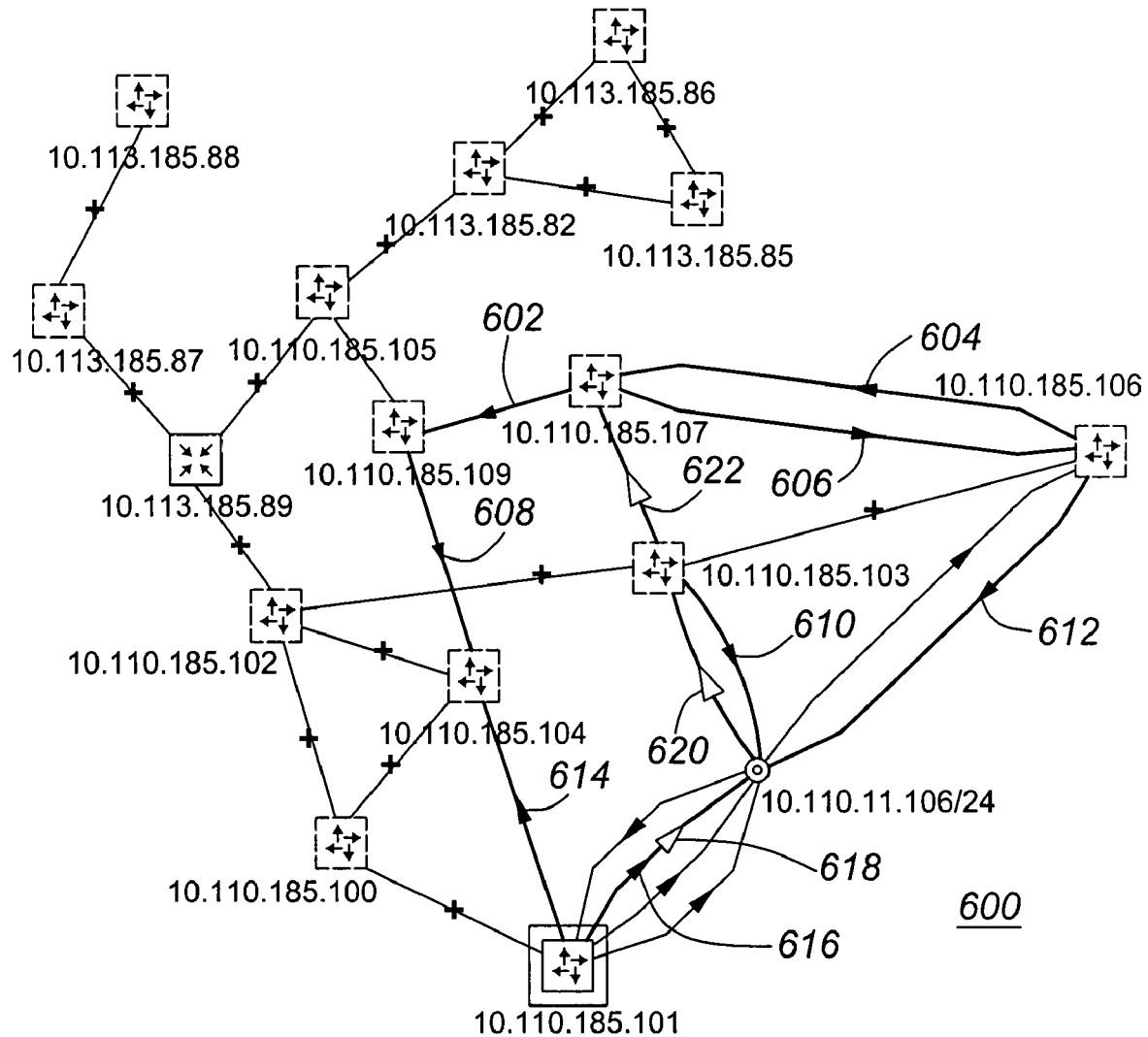
FIG. 6 is a schematic diagram of a fragmented portion of a second embodiment of an exemplary MPLS topology map.

Taking the foregoing concept further, FIG. 6 is a schematic diagram of a fragmented portion of a second embodiment of an exemplary MPLS topology map 600.

The following triangles in topology map 600 indicate IGP links with a bandwidth greater than ten: 602, 604, 606, 608, 610, 612, 614 and 616. Similarly, the following triangles in topology map 600 indicate the LSP from node 10.110.185.101 to node 10.110.185.107: 618, 620 and 622.

Although MPLS/RSVP and LDP links can be operationally up there can still be the possibility that they are not functional. In some embodiments, a utility is run to determine if there are any possible configuration problems and the user is notified of possible problems. Accordingly, in various embodiments, one or more of the following checks are made.

A check is made to determine whether a system interface is not part of the MPLS configuration. A check is made to determine whether traffic engineering is not turned on. For LDP links, a check is made to determine whether a session exists. For RSVP links, a check is made to determine whether the health of the underlying IGP link is bad. For both the MPLS and LDP links, a check is made to determine whether their underlying network interface and/or ports are mis-configured.

CSPF uses constraints such as bandwidth and admin groups to choose the path that an RSVP LSP uses to cross the network. Any given RSVP LSP may be setup with or without CSPF enabled. A non-CSPF RSVP LSP will always try to follow the shortest path, as determined by the IGP, regardless of the bandwidth and admin group constraints of the configured LSP. If the shortest path does not have enough bandwidth, the LSP will not be operational for a non-CSPF RSVP LSP.

Diagnosing why any given RSVP LSP is not operational, especially when there are multiple hops and possibilities that the LSP can take to traverse the network, is problematic and time consuming. In various exemplary embodiments, root cause analysis (RCA) support for RSVP LSP provisioning provides tools that allow an operator to quickly diagnose and visualize RSVP LSP provisioning and maintenance problems. This enables the operator to determine the root cause of why the RSVP LSP is not operational.

Figure 7:
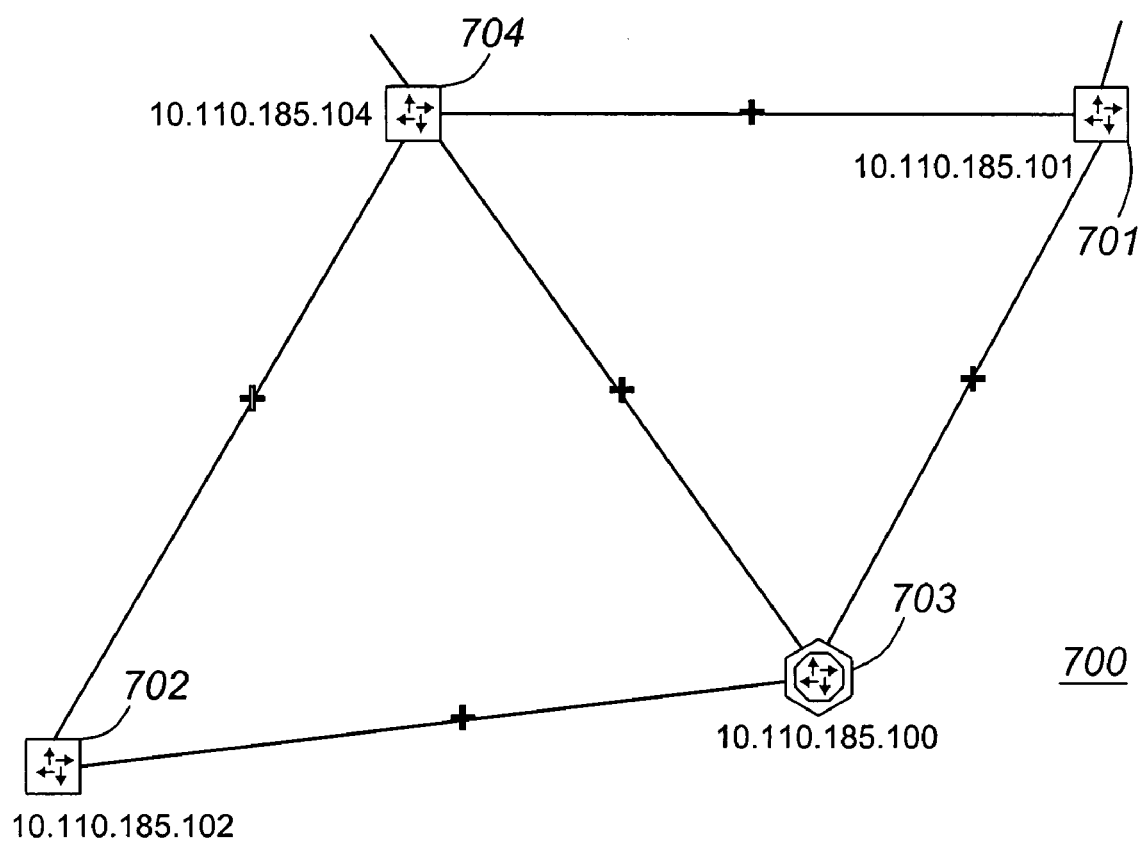
FIG. 7 is a schematic diagram of an exemplary sample network.

For non-CSPF RSVP LSPs, the potential route of the LSP is based on the IGP shortest path first (SPF) and the configuration of the hops in the path (strict or loose), regardless of the configured bandwidth or admin group criteria. FIG. 7 is a schematic diagram of an exemplary sample network 700. The network 700 is used as a simple example of any network for reference in connection with the following.

Figure 8:
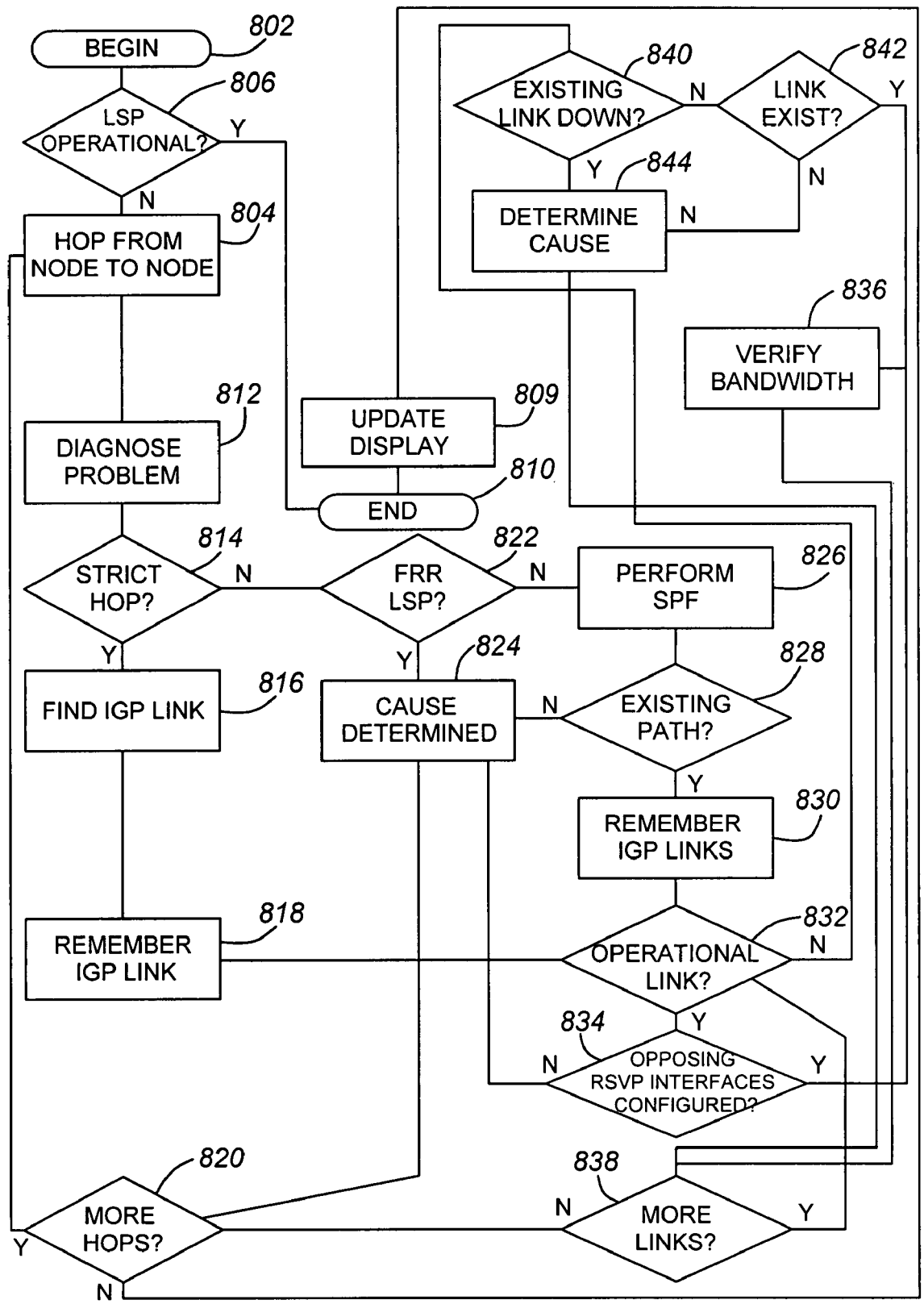
FIG. 8 is a flowchart an exemplary embodiment of a method of diagnosing a problem in a non-constrained shortest path first (CSPF) RSVP LSP.

FIG. 8 is a flowchart of an exemplary embodiment of a method 800 of diagnosing a problem in a non-CSPF RSVP LSP. The method 800 begins in step 802. The method then proceeds to step 806 where an evaluation is performed whether the LSP is operational. If the LSP for a particular hop is operational, the method 800 proceeds to step 810, where the method 800 ends. If the LSP for a particular hop is not operational, the method 800 proceeds to step 804. In step 804 a starting node is picked, and hops are made from node to node traversing the network from beginning to end.

For each node traversed during step 804, the method proceeds to step 812 where the problem is diagnosed. In various exemplary embodiments, the steps taken by the system and method in order to diagnose the problem include one or more of the following.

In step 814 an evaluation is made whether the hop is a strict hop or a loose hop. If a determination is made in step 814 that the hop is a strict hop, the method 800 proceeds to step 816 where an IGP link is found. The method 800 then proceeds to step 818 where the found IGP link is remembered. The method 800 next proceeds to step 832 where an evaluation is made whether the link is operational. This will be discussed in greater detail below.

When the method 200 reaches step 820, an evaluation is made whether there are any more hops. If an evaluation is made in step 820 that there are more hops, the method 800 returns to step 804 and continues to hop from node to node traversing the network. If a determination is made in step 820 that there are not any more hops, then the method 800 proceeds to step 809 where the display is updated. Updating the display in step 809 will also be discussed in greater detail below.

If a determination is made in step 814 that the hop is a loose hop, the method 800 proceeds to step 822 where a determination is made whether the LSP is configured with fast reroute. If a determination is made in step 822 that the LSP is configured with fast reroute, then the method 800 proceeds to step 824 where it is determined that this is the reason why the LSP is not becoming operational, because FRR cannot have loose hops in non-CSPF. If a determination is made in step 822 that the LSP is not configured with FRR, the method proceeds to step 826.

In step 826, an SPF is performed from the previous hop or start of the network and the current hop. It is recommended that an evaluation be performed in step 826 where an equal cost multi-path (ECMP) exists. If an ECMP exists, the SPF would return more than one path between the previous hop and the current hop. In that instance, the LSP would only be capable of taking one of the multiple paths returned. In that instance, it would not be possible to determine which of the ECMPs the LSP has taken.

Following step 826 the method 800 proceeds to step 828 where an evaluation is performed whether there is an existing path. If there is not an existing path, then the method 800 proceeds to step 824 where a determination is made that the lack of an existing path is the cause of the problem.

If a determination is made in step 828 that there is an existing path, the method 800 proceeds to step 830 where the set of IGP links are remembered. Following step 830, the method 800 proceeds to step 832 where a first of the remembered IGP links from step 830 is evaluated to determine whether the link is operational. If a determination is made in step 832 that the link is operational, then the method 800 proceeds to step 834.

In step 834, an evaluation is performed whether the RSVP interface is configured between the current link and a link in the opposite direction. If a determination is made in step 834 that there is not an RSVP interface configured between the current link and a link in the opposite direction, then the method 800 proceeds to step 824 where a determination is made that the absence of this configuration is the cause of this problem.

If a determination is made in step 834 that the RSVP interface is configured between the current link and a link in the opposite direction, then the method 800 proceeds to step 836 where it is verified that there is enough bandwidth on the IGP link to meet the LSP's desired bandwidth requirement. If there is not enough bandwidth, then a determination is made that the insufficiency of the existing bandwidth is the cause of the problem.

Following step 836, the method 800 proceeds to step 838 where a determination is made whether there are more IGP links remembered in step 830 that have not yet been evaluated in step 832. If a determination is made in step 838 that more links exists, the method 800 returns to step 832. If a determination is made in step 838 that there are not more links remembered in step 830 to evaluate, then the method 800 proceeds to step 820.

When a determination is made in step 832 that the IGP link being evaluated is not operational, the method 800 proceeds to step 840 where an evaluation is made whether an existing IGP link is currently operationally down. If it is not possible to verify in step 840 that an existing IGP link is currently operationally down, the method 800 proceeds to step 842 where an evaluation is made whether an existing IGP link even exists.

If a determination is made in step 842 that no IGP link exists, the method proceeds to step 844 where two scenarios may explain the cause of the problem. First, an invalid hop may be specified. This may correspond to a mis-configuration on the LSP. Second, it may be the case that there should actually be an operational IGP link based on the configuration of the appropriate network interfaces on the adjacent hops, as suggested by the configuration. However, there might be no IGP link known by the system. If a determination is made in step 842 that the IGP link exists, then the method 800 proceeds to step 836 and continues as discussed above in connection with step 836.

Applying an example of an application of method 800 to sample network 700, the method starts at node 702. At that point, a determination is made that the LSP is not becoming operational. This corresponds to step 806. The method then proceeds to step 804. Then a strict hop is taken to node 703.

An evaluation is then made of the first hop from node 702 to node 703. A determination is made that the hop is strict. An IGP link for the hop from node 702 to 703 is obtained. A verification is made that the link exists, that the link is operationally up, that the RSVP is configured, and that there is appropriate bandwidth.

On that basis, the method 800 returns to step 804 and the next hop, a loose hop from node 703 to 701 is evaluated. A determination is made that the hop is loose. An SPF is then performed from node 703 to 701. In this example, the following route is returned from the SPF: node 703 to 704 and then node 704 to 701. The method then verifies that each of these links exists, it is operationally up, has an RSVP configured, and that there is appropriate bandwidth.

A display of network 700 is then highlighted to emphasize the determined path from node 702 to node 703, from node 703 to node 704, and from node 704 to node 701. In various exemplary embodiments, the foregoing path is illustrated using colored arrows, triangles and/or colored lines connecting the various nodes.

Furthermore, if a determination is made that a link between node 703 and node 704 is the probable cause as to why the LSP is not operational, then that link is emphasized in the diagram 700. For example, in one embodiment a bright red color is used for the line connecting node 703 to node 704 in the diagram 700 to indicate a determination that the link between node 703 and node 704 is likely the cause of why the LSP is not operational.

In various exemplary embodiments, different forms of emphasis in the link between node 703 and node 704 are used to represent different identified causes of the problem in the link between node 703 and node 704. For example, in some embodiments different colors are used for the link between node 703 and node 704 in diagram 700 to correspond to different identified sources of problems.

Each time a source of a problem in the network is diagnosed, as described above, in step 809 a display of the topology map 100 is altered to update the representation of the topology in a manner that identifies the diagnosed source of the problem. Using the foregoing example, in various exemplary embodiments a bright red color for the link between node 703 and node 704 is used to illustrate an identification that a lack of bandwidth between node 703 and node 704 is responsible for causing the LSP to not be operational.

In various exemplary embodiments, additional information is posted on the diagram 700 in a textural manner. In various exemplary embodiments, additional information is also provided in response to placing a mouse cursor on or near the emphasized link, here the link between nodes 703 and 704.

Figure 9:
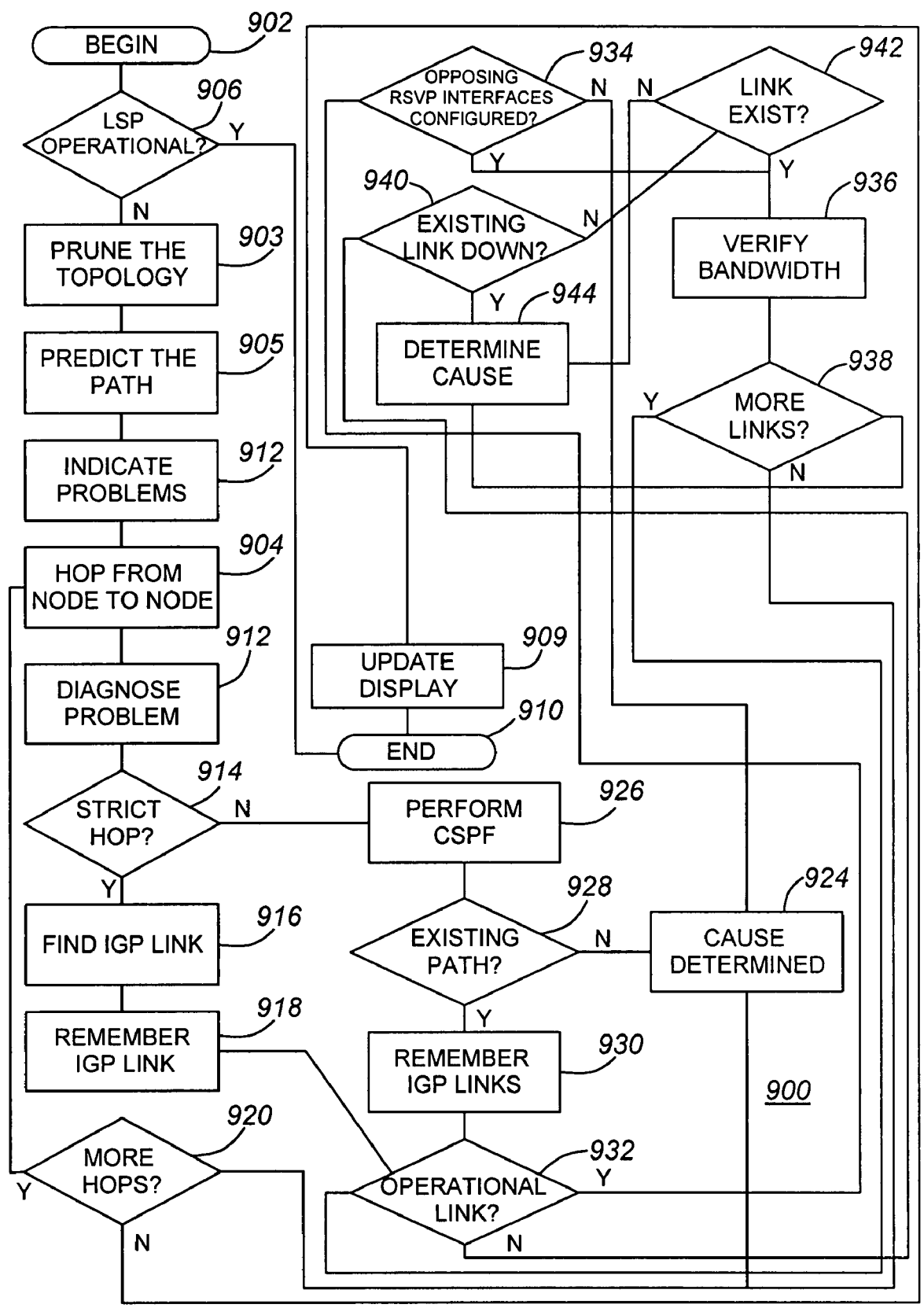
FIG. 9 is a flowchart of an exemplary embodiment of a method of diagnosing a problem in a CSPF RSVP LSP.

FIG. 9 is a flowchart of an exemplary embodiment of a method 900 of diagnosing a problem in a CSPF RSVP LSP. For CSPF RSVP LSPs, the path that LSP takes through the network is dependent on several factors. Those factors include 1) the configured hops and whether the configured hops are strict or loose; 2) the desired bandwidth such that only links with sufficient bandwidth are considered; and 3) the configured admin groups such that only links are considered that include (or exclude, depending on the configuration) a specific set of admin groups.

The foregoing criteria are used to include or exclude links that participate with the shortest path calculation. This means links that do not match the criteria may be routed around by a CSPF RSVP LSP, while a non-CSPF RSVP LSP cannot route around links that do not match the criteria.

One problem is that it becomes more difficult to diagnose why a provisioned CSPF RSVP LSP is not operational due to the increased number of variables affecting the path. The subject matter described herein greatly simplifies the operation of the system and method and reduces the time necessary to diagnose problems in the network by pinpointing and visualizing the root cause of the problems.

Referring again to FIG. 7, an RSVP LSP is provisioned as follows. The link from node 702 to node 703 is assigned to admin group a. The link from node 702 to node 704 is assigned to admin group b. The link from node 704 to node 701 is assigned to admin group c. The link from node 703 to node 704 is assigned to admin groups a and c. The link from node 703 to node 701 is assigned to admin groups a and b.

In an embodiment based on the foregoing that requires admin group b, and starts at node 702, with the loose hop to node 701, the LSP will not become operational. If the diagnosis method is executed, in various exemplary embodiments by clicking a diagnose button, one or more of the following are considered in various exemplary embodiments.

As the CSPF-based LSPs have the potential to avoid areas of the network that do not match their criteria, a different approach is needed than in non-CSPF based LSPs, as described above. The different approach basically follows the configured hops and the IGP SPF.

At a high level, there are three steps the CPAM takes, according to various exemplary embodiments, in diagnosing a problem. Thus, exemplary method 900 begins in step 902. The method 900 then proceeds to step 906 where an evaluation is performed whether the LSP is operational. If the LSP for a particular hop is operational, the method 900 proceeds to step 910, where the method 900 ends. If the LSP for a particular hop is not operational, the method 900 proceeds to step 903 where the topology is pruned so as to remove links that do not match the RSVP LSP's criteria. Then, the method 900 proceeds to step 905 where a path that the CSPF RSVP LSP takes through the network is predicted.

Following step 905, the method 900 proceeds to step 912 where problematic parts of the network 700 that may be preventing the CSPF RSVP LSP from becoming operational are indicated to the user. In the simple network 700, it is obvious by looking at the visualization that the CSPF LSP is not operational in the previously described example because there is a disconnect in the admin groups configured for the various hops between the depicted nodes.

In various exemplary embodiments, basic connectivity graph algorithms are used to indicate to the user specific details of disconnects in the graph. Furthermore, in various exemplary embodiments, feedback as to why certain links are excluded is also included in the display to a user of the system by annotating the link with the available bandwidth and the configured admin groups in the visual display.

Going back to the admin groups between the nodes of simple exemplary network 700 described above, the link between node 704 and node 703 along with the link between node 704 and node 701 are responsible for the failure of the LSP to become operational because neither of these links are configured in admin group b.

If the method 900 proceeds through step 912 without identifying the problem, it may still be possible that the CSPF LSP is operationally down. In that instance, further analysis is performed by proceeding to step 904 where, for each provisioned hop in the RSVP LSP path, including primary, secondary and standby hops, depending on the scenario, the method 900 hops from node to node in step 904. The method then proceeds to step 912. Steps 909, 910, 912, 914, 916, 918, and 920 then proceed in a manner comparable respectively to steps 809, 810, 812, 814, 818 and 820 described above in connection with FIG. 8.

If a determination is made in step 914 that the hop is not a strict hop, that is, that the hop is a loose hop, the method 900 proceeds to step 926. In step 926, a CSPF is performed from the previous hop, or the start, and the current hop.

In connection with step 926, in various exemplary embodiments an evaluation is performed regarding ECMP because the CSPF could return more than one path between the previous hop and the current hop in the case of ECMP, and the LSP only takes one of the multiple paths returned. In that instance, it is not possible to determine which of the multiple paths the LSP takes. Following step 926, the method proceeds to step 928. Steps 924, 928, 930, 932, 934, 936, 938, 940, 942 and 944 correspond, respectively, to steps 824, 828, 830, 832, 834, 836, 838, 840, 842 and 844 in FIG. 8.

An RSVP LSP consists of one or more configured paths, where some are marked as primary and others are indicated as a standby and/or as a secondary path. At any one time, only a single path is active. The route that this active path takes through the network is called the LSP's actual path.

An RSVP LSP configured in the network may change its actual path at any time for many different reasons. These reasons include, but are not limited to, the following: IGP network topology changes such as links going up or down, metric changes, and so on; bandwidth usage changes; admin group changes; and MPLS/RSVP configuration changes.

An actual path change may result from an LSP's primary path switching to a secondary or a stand-by path, or simply by a change in the current path. It is possible that at other times the LSP may be operationally down in that there is no actual path.

In order to aid the management and monitoring of the health of the network, it is beneficial to understand both how the network is currently behaving. It is also beneficial to understand how the network behaved in the past, even weeks in the past. Thus, various exemplary embodiments archive recorded historical data regarding RSVP LSP actual paths. The monitoring and recording of RSVP LSP actual path allows for the network operation to more fully understand the behavior of a current MPLS RSVP network.

In fact, understanding how just one path was affected by a network fault at some time in the past can be greatly beneficial to understand the current health of an MPLS network. However, as more RSVP LSPs are configured, understanding the relationships of a single fault to many LSPs can easily becomes unduly cumbersome. This problem is further compounded when data is archived at different times.

Thus, in various exemplary embodiments, an operator is enabled to setup the monitoring and recording of the actual paths of RSVP LSPs. In various exemplary embodiments, the user then visualizes on the displayed topology map the path that the RSVP LSP is taking now or in the past.

There are at least two ways to set up a monitored RSVP LSP. One is from the standard monitored path manager used to monitor RSVP LSPs, IP routes, and other paths. Another is from the RSVP LSP configuration form.

Based on the foregoing, assume that a determination is made that a path changed at a certain time in the past. Why did the path change then? The answer to this question is beneficial in determining the root cause of a switchover or failed RSVP LSPs. Was it due to a topology change? Was it due to a configuration change? Was it due to a bandwidth usage change? It could be one of these reasons or a combination of two or more of these reasons.

Thus, various exemplary embodiments use historical routing data and historical alarm data, along with soft failures such as OAM test results, to correlate an RSVP LSP's actual path change with a specific series of topology changes, alarms, or test failures. Various exemplary embodiments consider one or more of the following variables: time proximity between events; and physical proximity between elements where events occurred. Thus, various exemplary embodiments consider whether an event occurred on links used by the RSVP LSP, or on links that are related to the RSVP LSP, but not actually in use by it.

It should be noted that local time and physical proximity are not necessary to indicate a relationship. It is possible that an event that is not close in time nor close in physical proximity, can have a substantial impact.

Figure 10:
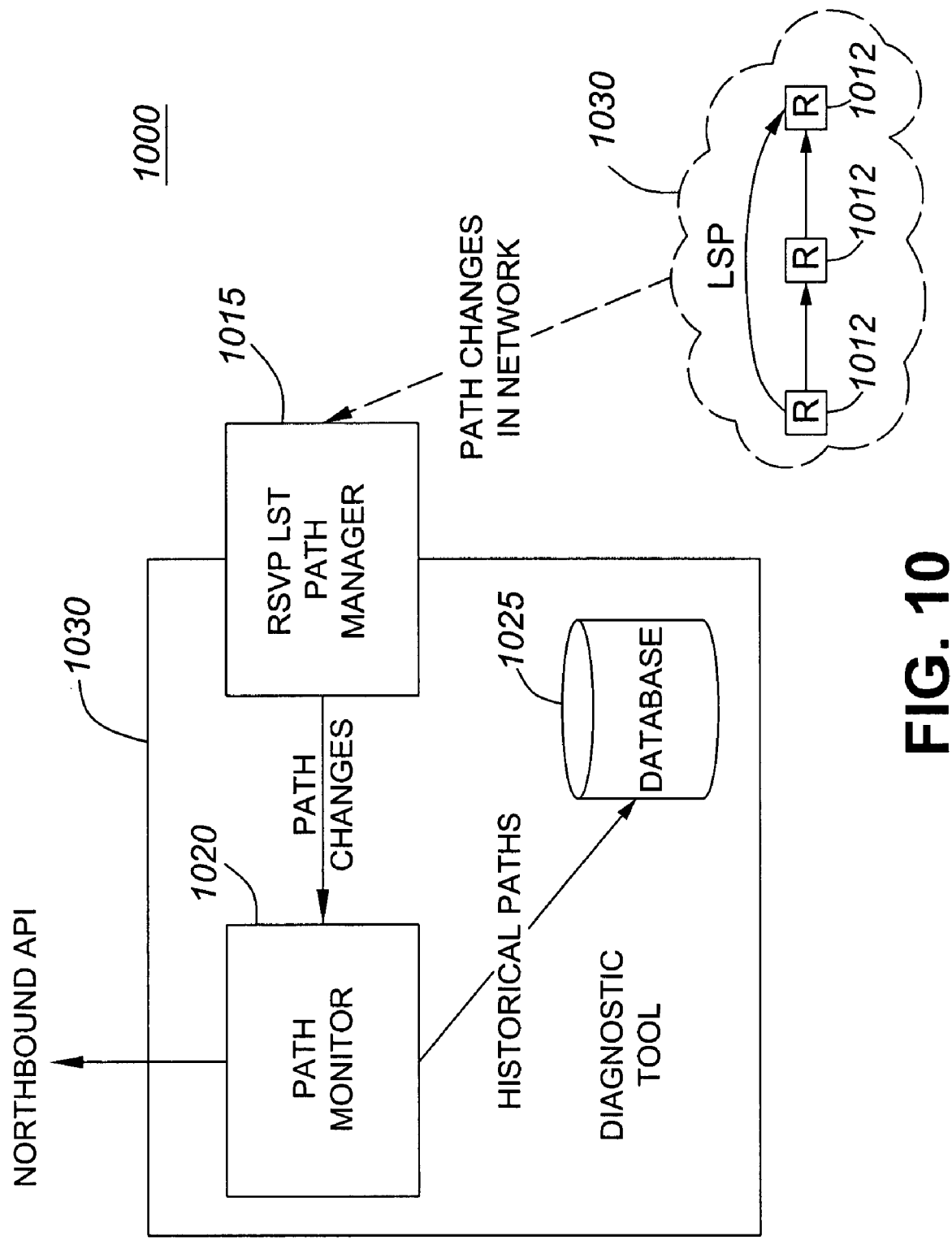
FIG. 10 is a schematic diagram of an exemplary system for diagnosing problems in an MPLS network.

FIG. 10 is a schematic diagram of an exemplary system 1000 for diagnosing problems in an MPLS network, as described above.

The system 1000 includes a network 1010. The network 1010 includes routers 1012. Path changes between network elements such as routers 1012 in the network 1010 are communicated to an RSVP LSP path manager 1015. Those path changes are then relayed to a path monitor 1020. A historical archive of paths followed between network elements in the network 1010 is archived in database 1025 from path monitor 1020. The RSVP LSP path manager 1015, the path monitor 1020 and the database 1025 are components included in an exemplary diagnostic tool 1030.

Figure 11:
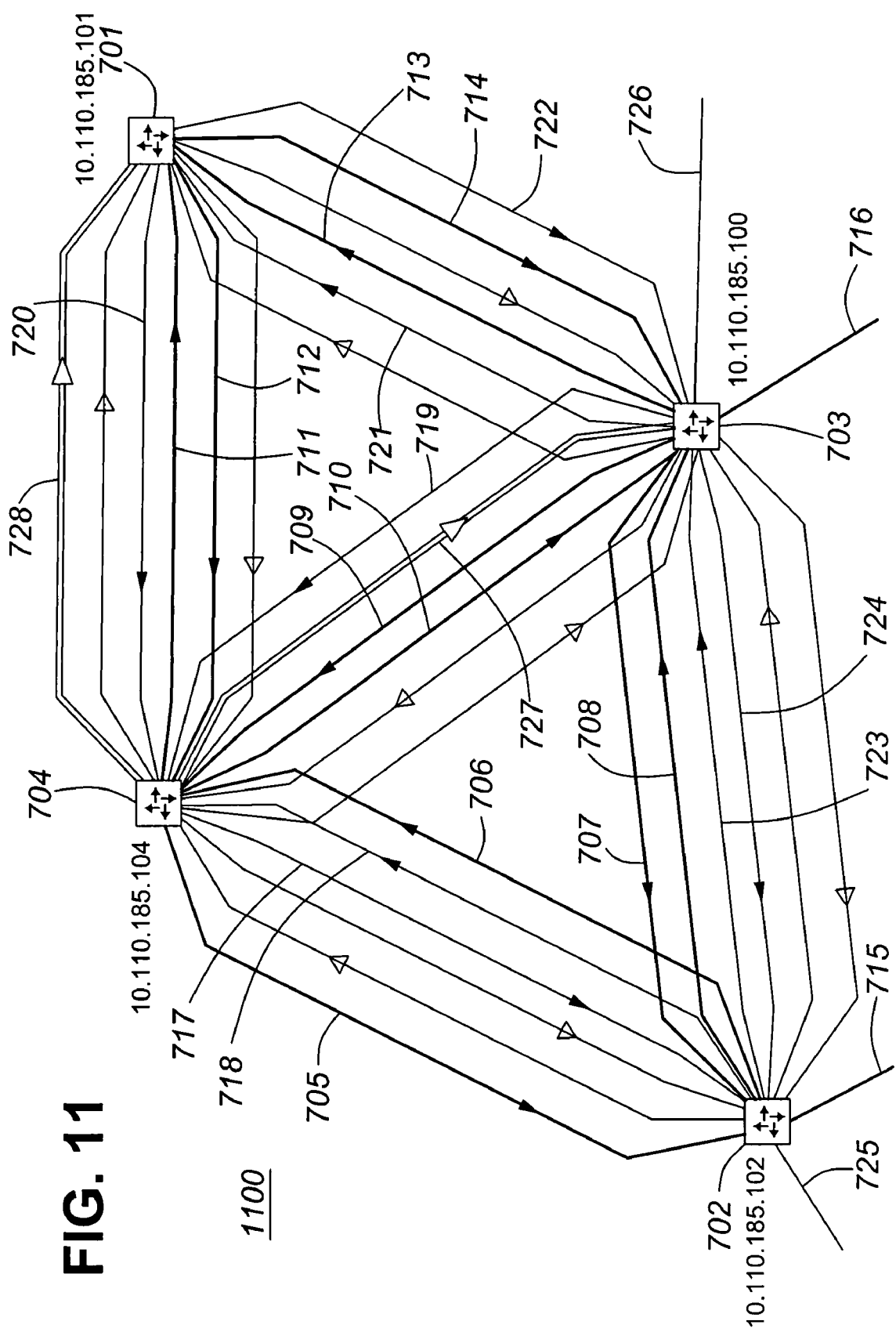
FIG. 11 is a schematic diagram of the fragmented portion of FIG. 6 showing a third embodiment of an exemplary MPLS topology.

FIG. 11 is a schematic diagram of the fragmented portion of FIG. 6 showing a third embodiment of an exemplary MPLS topology map 1100.

An LDP tunnel follows the IGP shortest path through the network. Any problems along the shortest path, or if there is no path, would impact the operational status of the LDP tunnel.

With reference to topology map 1100, imagine that an LDP tunnel is designed from node 702 to node 701. In this example, the current IGP shortage path in the network follows the path from node 702 to node 704, from node 704 to node 703, and from node 703 to node 701. The following links represent MPLS/RSVP links that are operational: 705, 706, 707, 708, 709, 710, 711, 712, 713, 714, 715 and 716. The following links represent LDP links that are operational: 717, 718, 719, 720, 721, 722, 723, 724, 725 and 726. Links 727 and 728 represent LDP links that are down.

When dealing with LDP tunnels, LDP links are important. This will be further discussed now in connection with FIG. 12.

Figure 12:
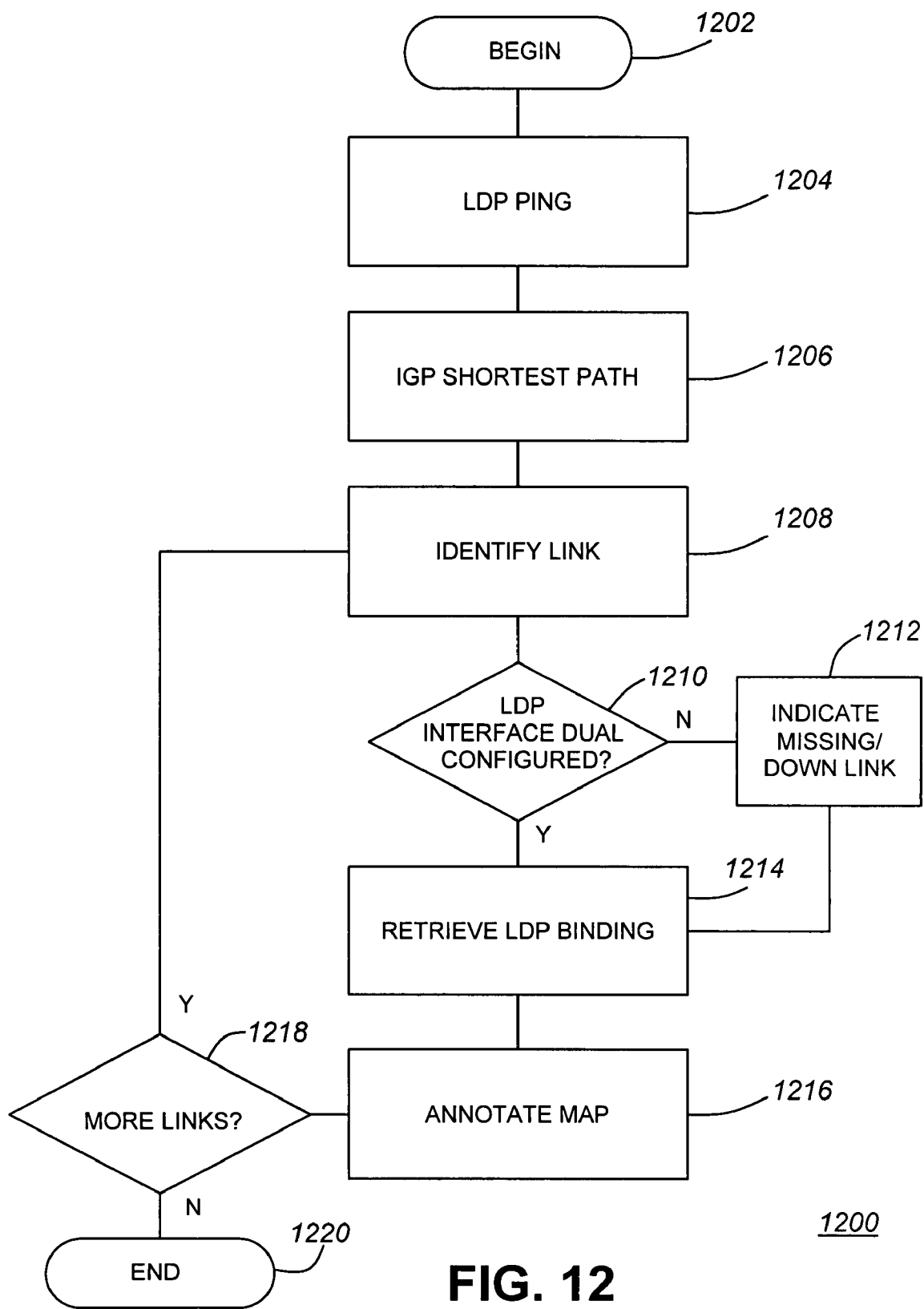
FIG. 12 is a flow chart of an exemplary embodiment of a method of diagnosing problems with label distribution protocol (LDP) tunnels.

FIG. 12 is a flow chart of an exemplary embodiment of a method 1200 of diagnosing problems with LDP tunnels. The method 1200 begins in step 1202 and then continues to step 1204. In step 1204, an LDP ping is performed to verify whether an LDP tunnel exists or not. It is assumed that this operation is supported by the network. Otherwise, step 1204 is skipped.

The method 1200 then proceeds to step 1206 where an IGP shortest path is performed. Typically, this would occur with ECMP support. The method 1200 then proceeds to step 1206 where a first link in the IGP shortest path is identified. For the identified link, in step 1210, an evaluation is performed whether the LDP interface is configured in both directions.

If the outcome of the evaluation performed in step 1210 is the conclusion that the LDP interface is not configured in both directions, the method 1200 proceeds to step 1212 where an indication is made on the topology map that the LDP link is missing or operationally down. Following step 1212, the method proceeds to step 1214. Similarly, if a determination is made in step 1210 that the LDP interface is configured in both directions, the method 1200 proceeds to step 1214.

In step 1214, the LDP bindings are retrieved at each endpoint of the link, including the labels. The method 1200 then proceeds to step 1216 where the LDP labels are annotated on the links in the topology map. The method 1200 then proceeds to step 1218 where an evaluation is performed whether additional links exists in the IGP shortest path identified in step 1206.

If the outcome of the evaluation performed in step 1218 is the conclusion that additional links in the IGP shortest path identified in step 1206 exist, the method 1200 returns to step 1208. Conversely, if the outcome of the evaluation performed in step 1218 is that no more links in the IGP shortest path identified in step 1206 exist, the method 1200 proceeds to step 1220 where the method 1200 ends.

Although the various exemplary embodiments have been described in detail with particular reference to certain exemplary aspects thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A method of diagnosing a problem in a multi-protocol label switching network, comprising:
hopping from a first network element to a second network element in the multi-protocol label switching network;
determining that a label switched path between the first network element and the second network element is not operational;
identifying that the hopping from the first network element to the second network element was strict;
finding an interior gateway protocol link between the first network element and the second network element;
remembering the interior gateway protocol link between the first network element and the second network element;
diagnosing causes of the label switched path between the first network element and the second network element not being operational; and
altering a display of a topology map of the multi-protocol label switching network to indicate the diagnosed causes of the label switched path between the first network element and the second network element not being operational, wherein different colors on a particular link in the altered display correspond to different diagnosed causes on the particular link.

2. A method of diagnosing a problem in a non-constrained shortest path first multi-protocol label switching network, comprising:
hopping from a first network element to a second network element in the first multi-protocol label switching network;
determining that a label switched path between the first network element and the second network element is not operational;
identifying that the hopping from the first network element to the second network element was loose;
recognizing that the label switched path is a fast reroute label switched path;
diagnosing causes of the label switched path between the first network element and the second network element not being operational; and
altering a display of a topology map of the multi-protocol label switching network to indicate the diagnosed causes of the label switched path between the first network element and the second network element not being operational, wherein different colors on a particular link in the altered display respectively correspond to different diagnosed causes on the particular link.

3. A method of diagnosing a problem in a multi-protocol label switching network, comprising:
hopping from a first network element to a second network element in the multi-protocol label switching network;
determining that a label switched path between the first network element and the second network element is not operational;
evaluating whether there is an existing path between the first network element and the second network element;
diagnosing causes of the label switched path between the first network element and the second network element not being operational; and
altering a display of a topology map of the multi-protocol label switching network to indicate the diagnosed causes of the label switched path between the first network element and the second network element not being operational, wherein different colors on a particular link in the altered display respectively correspond to different diagnosed causes on the particular link.

4. The method of diagnosing a problem in a multi-protocol label switching network, according to claim 3, further comprising:
remembering an interior gateway protocol link between the first network element and the second network element; and
determining whether the interior gateway protocol link between the first network element and the second network element is operational.

5. The method of diagnosing a problem in a multi-protocol label switching network, according to claim 4, further comprising:
evaluating whether a reservation protocol interface is configured in both directions between the first network element and the second network element.

6. The method of diagnosing a problem in a multi-protocol label switching network, according to claim 4, further comprising:
evaluating whether an existing interior gateway protocol link between the first network element and the second network element is down.

7. The method of diagnosing a problem in a multi-protocol label switching network, according to claim 6, further comprising:
evaluating whether an interior gateway protocol link exists between the first network element and the second network element.

8. The method of diagnosing a problem in a multi-protocol label switching network, according to claim 7, further comprising:
verifying that sufficient bandwidth exists on the interior gateway protocol link to satisfy bandwidth requirements of the label switched path.

9. A system for diagnosing a problem in a multi-protocol label switching network, comprising:
means for determining that a label switched path between a first network element and a second network element is not operational;
means for hopping from the first network element to the second network element;
means for identifying whether the hopping from the first network element to the second network element was loose or strict;
means for diagnosing causes of the label switched path between the first network element and the second network element not being operational; and
means for altering a display of a topology map of the multi-protocol label switching network to indicate the diagnosed causes of the label switched path between the first network element and the second network element not being operational, wherein different colors on a particular link in the altered display respectively correspond to different diagnosed causes on the particular link.

10. The system for diagnosing a problem in a multi-protocol label switching network, according to claim 9, wherein the multi-protocol label switching network is a non-constrained shortest path first multi-protocol label switching network.

11. The system for diagnosing a problem in a multi-protocol label switching network, according to claim 9, wherein the multi-protocol label switching network is a constrained shortest path first multi-protocol label switching network.

12. The system for diagnosing a problem in a multi-protocol label switching network, according to claim 9, further comprising:
means for finding and remembering an interior gateway protocol link between the first network element and the second network element.

13. The system for diagnosing a problem in a multi-protocol label switching network, according to claim 9, further comprising:
means for determining whether an interior gateway protocol link between the first network element and the second network element is operational.

14. The system for diagnosing a problem in a multi-protocol label switching network, according to claim 13, further comprising:
means for evaluating whether a reservation protocol interface is configured in both directions between the first network element and the second network element.

15. The system for diagnosing a problem in a multi-protocol label switching network, according to claim 13, further comprising:
means for evaluating whether an existing interior gateway protocol link between the first network element and the second network element is down.

16. The system for diagnosing a problem in a multi-protocol label switching network, according to claim 15, further comprising:
means for evaluating whether an interior gateway protocol link exists between the first network element and the second network element.

17. The system for diagnosing a problem in a multi-protocol label switching network, according to claim 16, further comprising:
means for verifying that sufficient bandwidth exists on the interior gateway protocol link to satisfy bandwidth requirements of the label switched path.

18. A diagnostic tool that diagnoses problems in a multi-protocol label switching network, comprising:
a reservation protocol label switched path manager that receives information regarding path changes between a plurality of elements in the multi-protocol label switching network;
a path monitor that monitors and evaluates the information regarding path changes between the plurality of elements in the multi-protocol label switching network, including diagnosing causes of label switched paths between the plurality of elements in the multi-protocol label switching network not being operational, and altering a display of a topology map of the multi-protocol label switching network to indicate the diagnosed causes of the label switched paths between the plurality of elements not being operational, wherein different colors on a particular link in the altered display respectively correspond to different diagnosed causes on the particular link; and
a database that archives time-stamped historical information regarding path changes between the plurality of elements in the multi-protocol label switching network and diagnosed causes of label switched paths between the plurality of elements in the multi-protocol label switching network not being operational.

19. A method of diagnosing a problem with a label distribution protocol tunnel between a first network element and a second network element in a multi-protocol label switching network, comprising:
performing an interior gateway protocol shortest path in the multi-protocol label switching network;
identifying a link in the interior gateway protocol shortest path;
evaluating whether an interface in the label distribution protocol is configured in both directions between the first network element and the second network element;
retrieving label distribution protocol bindings at a first end point and at a second end point of the label distribution protocol tunnel;
identifying causes of the problem with the label distribution protocol tunnel; and
altering a display of a topology map of the multi-protocol label switching network that includes the label distribution protocol tunnel to indicate the identified causes of the label switched path between the first network element and the second network element not being operational, wherein different colors on a particular link in the altered display respectively correspond to different identified causes on the particular link.

20. The method of diagnosing a problem with a label distribution protocol tunnel, according to claim 19, further comprising:
performing a label distribution protocol ping to evaluate whether a label distribution protocol tunnel exists.

21. The method of diagnosing a problem with a label distribution protocol tunnel, according to claim 19, wherein retrieving label distribution protocol bindings at a first end point and at a second end point of the label distribution protocol tunnel includes retrieving a label of the first end point and retrieving a label of the second end point.

* * * * *